United States Patent
Licudi et al.

(10) Patent No.: US 12,430,433 B2
(45) Date of Patent: Sep. 30, 2025

(54) DYNAMIC WINDOWING FOR PROCESSING EVENT STREAMS

(71) Applicant: Arm Limited, Cambridge (GB)

(72) Inventors: Archie David Licudi, London (GB); Michael Bartling, Austin, TX (US)

(73) Assignee: Arm Limited, Cambridge (GB)

( * ) Notice: Subject to any disclaimer, the term of this patent is extended or adjusted under 35 U.S.C. 154(b) by 219 days.

(21) Appl. No.: 17/972,986

(22) Filed: Oct. 25, 2022

(65) Prior Publication Data

US 2024/0134978 A1 Apr. 25, 2024
US 2024/0232351 A9 Jul. 11, 2024

(51) Int. Cl.
*G06F 21/56* (2013.01)
*G06F 9/54* (2006.01)

(52) U.S. Cl.
CPC ............ *G06F 21/566* (2013.01); *G06F 9/542* (2013.01); *G06F 2221/034* (2013.01)

(58) Field of Classification Search
CPC .......... G06F 21/56; G06F 21/566; G06F 9/54; G06F 9/505; G06F 9/542; G06F 9/5038; G06F 9/5044; G06F 2221/034; G06N 5/04; G06N 20/00; H04L 63/1416;
(Continued)

(56) References Cited

U.S. PATENT DOCUMENTS 7,827,123 B1 * 11/2010 Yagnik .................... G06N 20/00
706/12
8,904,410 B2 * 12/2014 Kelly ...................... G06F 9/542
719/318
2007/0233628 A1 10/2007 Sherwood et al.
(Continued)

FOREIGN PATENT DOCUMENTS

CN 112363891 A 2/2021
WO 2013095429 A1 6/2013
WO 2018215062 A1 11/2018

OTHER PUBLICATIONS

Morrill, James et al., "A Generalised Signature Method for Multivariate Time Series Feature Extraction," Feb. 6, 2021, 22 pages, arXiv.
(Continued)

*Primary Examiner* — James N Fiorillo
(74) *Attorney, Agent, or Firm* — Leveque Intellectual Property Law, P.C.

(57) ABSTRACT

A method and apparatus to classify processor events is provided. The apparatus includes a reference generator, a warping unit, a correlation unit and a detector. The reference generator provides a self-reference for an event vector stream based on a history of the event vector stream and the warping unit dynamically aligns the event vector stream with the self-reference to generate a warped event vector stream. The correlation unit determines a window-by-window correlation of event vectors of the warped event vector stream, and the detector passes a window of event vectors of the warped event vector stream to a behavioral classifier when the window-by-window correlation achieves a threshold value. The behavioral classifier may use machine learning. A sample reservoir may be used to store dynamically selected event vectors of the event vector stream that are used, at least in part, to generate the self-reference.

19 Claims, 3 Drawing Sheets

(58) Field of Classification Search
CPC . H04L 63/1425; H04L 63/1458; H04L 43/16; H04L 41/16; H04L 41/142; H04L 41/0622
USPC .......................................................... 726/23
See application file for complete search history.

(56) References Cited

U.S. PATENT DOCUMENTS

| | | |
|---|---|---|
| 2008/0183430 A1 | 7/2008 | Kitsunai et al. |
| 2008/0301124 A1 | 12/2008 | Alves et al. |
| 2012/0330638 A1* | 12/2012 | Pell ...................... G06F 30/327 703/21 |
| 2015/0293954 A1 | 10/2015 | Hsiao et al. |
| 2016/0306678 A1 | 10/2016 | Hira et al. |
| 2017/0041688 A1 | 2/2017 | Pitigoi-Aron et al. |
| 2017/0160813 A1* | 6/2017 | Divakaran ............... G10L 15/22 |
| 2018/0004948 A1* | 1/2018 | Martin ................ H04L 63/1425 |
| 2018/0168498 A1* | 6/2018 | Bernstein ................ G06F 3/017 |
| 2018/0217914 A1 | 8/2018 | Sawada et al. |
| 2018/0232627 A1* | 8/2018 | Rozen .................... G06N 3/063 |
| 2019/0124099 A1* | 4/2019 | Matselyukh ............ H04L 41/16 |
| 2019/0205185 A1 | 7/2019 | Alfred et al. |
| 2020/0058034 A1* | 2/2020 | Sloane ................... G06F 21/577 |
| 2020/0183583 A1 | 6/2020 | Kachare et al. |
| 2020/0206920 A1* | 7/2020 | Ma ...................... G06F 11/3476 |
| 2022/0100575 A1* | 3/2022 | Lee ........................ G06F 9/5066 |
| 2022/0147008 A1* | 5/2022 | Cooley ............... G06F 18/2178 |
| 2022/0164029 A1* | 5/2022 | Chin ..................... A61B 5/7267 |
| 2022/0345215 A1 | 10/2022 | Ye et al. |
| 2023/0076893 A1* | 3/2023 | Arani ..................... G06N 3/045 |
| 2023/0122121 A1* | 4/2023 | O'Donoghue .......... G06F 18/22 706/12 |
| 2023/0196621 A1* | 6/2023 | Robertson ............. G06T 3/4038 382/164 |
| 2023/0205896 A1* | 6/2023 | Bridges ................ G06F 21/6218 713/193 |
| 2023/0244619 A1* | 8/2023 | Hillel ................... G06F 13/404 711/170 |

OTHER PUBLICATIONS

Tobiyama et al., "A method for estimating process maliciousness with Seq2Seq model," 2018 International Conference on Information Networking (ICOIN), Chiang Mai, Thailand, 2018, pp. 255-260, doi: 10.1109/ICOIN.2018.8343120.

* cited by examiner

DYNAMIC WINDOWING FOR PROCESSING EVENT STREAMS

BACKGROUND

Computer-based analysis of time series has a large number of applications. A time series may be split into individual window segments for analysis and classification. When time series is received as a data stream, dynamic windowing may be desired to enable real-time analysis and classification.

For example, operations executed in a Central Processing Unit (CPU) or other circuit produce a series of "events". The event can be a negative event, such as a branch miss or a cache miss, or positive events, such as a completed (retired) instruction or data store, for example. Tracking and analyzing these results can provide an indication of the performance or characteristic of an application executed on the CPU.

BRIEF DESCRIPTION OF THE DRAWINGS

The accompanying drawings provide visual representations which will be used to describe various representative embodiments more fully and can be used by those skilled in the art to better understand the representative embodiments disclosed and their inherent advantages. In these drawings, like reference numerals identify corresponding or analogous elements.

DETAILED DESCRIPTION

Figure 1:
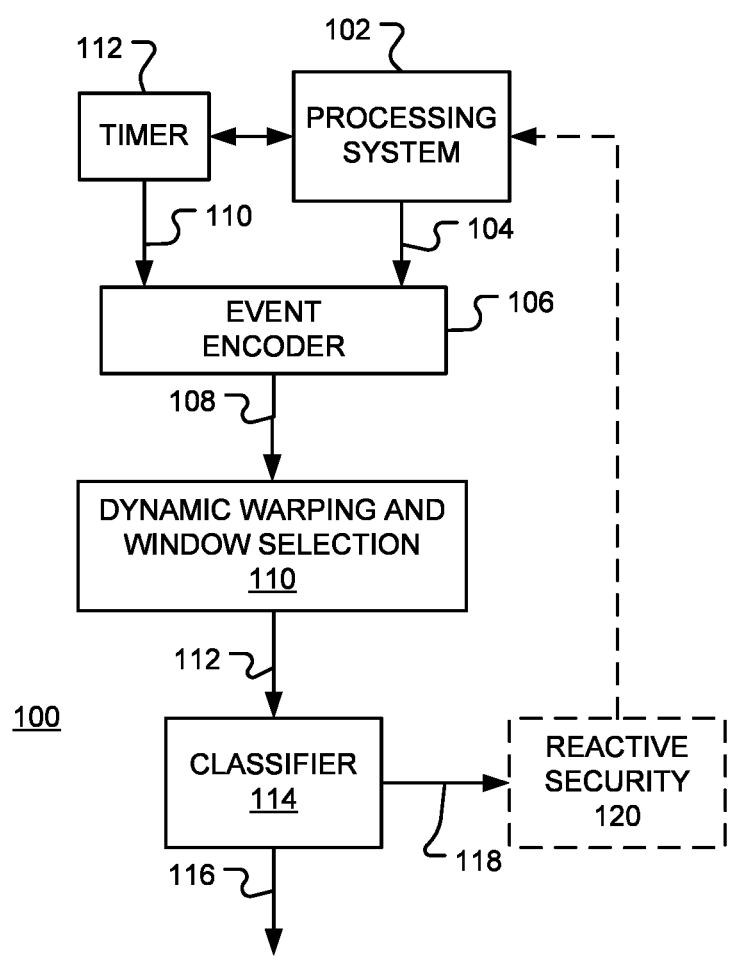
FIG. 1 is a block diagram of a data processing system, in accordance with various representative embodiments.

The various apparatus and devices described herein provide mechanisms for dynamically windowing high-throughput, sparse time series, yielding higher information density for classification tasks. The mechanisms can be used, for example, to classify the behavior of a processing system based on timed events occurring on the processor. The mechanisms normalize trends and accentuate anomalies or outliers in a robust manner, with minimal assumptions on the distribution of the input. The mechanisms may be used, for example, to improve overall security of a processing system by leveraging the complexity of system non-determinism against an attacker. The mechanisms may be used, more generally, to improve the accuracy of a classifier.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

When analyzing time series data for applications in machine learning, individual window segments of a time series can be analyzed and subsequently grouped into regions that express some notion of "closeness". For example, window segments may be grouped using k-means clustering or other any form of spatial clustering. The disclosed mechanism makes these clusters more distinct, in that the clusters are further apart from one another and elements within the same cluster closer together. This makes it easier to split the clusters.

Prior to such analysis, it may be desirable to mitigate the effect of nondeterminism in the input. The nondeterminism can be broadly categorized as "local noise", where individual data points are warped, and "structural noise," where individual data points are left comparatively unaltered but their positions in the series are distorted. As an example, the series [1, 2, 3] with added local noise of [1, 1, 0] becomes [2, 3, 3]. The same time series with structural noise of one insertion becomes [1, 0, 2, 3].

Structural noise in a time series can be mitigated by warping the time series to be in better alignment with a reference time series. Examples of warping techniques are Dynamic Time Warping (DTW) and Correlation Optimized Warping (COW). Reducing structural noise can provide greatly improved classifier accuracy.

A time series of processor events may be monitored to detect nefarious activity resulting from a security breach. "Reactive Security" seeks to identified and remediate security failures after they occur. It is beneficial to identify such failures as soon as possible so as to minimize the damage caused. The problem of identification is difficult since the behavior of the security failure is often not known in advance. In addition, any deterministic approach to identification could be learned by an attacker and used to avoid or delay detection.

A primary weakness with any performance monitoring system centers on the fact that adversaries can always "hide in the noise," in particular system noise. Modern software systems are extremely complex, spanning various strata of interactions and assumptions. Furthermore, these interactions are often skewed by runtime context. Measurements may be made with different programs, different input conditions, different external interactions, or with varying just-in-time program optimizations. These complications make the underlying process, in probability terms, extremely non-stationary.

This inherent non-determinism means that attackers have a controllable channel by which to inject nefarious content. The present disclosure uses system non-determinism against the attacker by leveraging correlation with non-stationary distributional behaviors to re-window input traces in real time. This both minimizes the magnitude of the noise (increasing information density) and obfuscates the distribution of the remaining non-determinism (increasing the difficulty of an adversarial derivation).

In recent years dynamic time warping (DTW) and correlational optimized warping (COW) have shown promising results for a wide range of machine learning (ML) tasks. DTW uses a cheap distance function to compare and align two time series and is most commonly based on L2 norms. COW, by comparison, was developed to re-window time series chromatogram data against a reference for chemical classification tasks and uses a similar dynamic programming approach to decide optimal window lengths. It uses the maximization of window-by-window correlation as its optimization objective, and linear interpolation to build its warping paths.

Both COW and DTW require a reference sequence, with the objective being to determine closeness or similarity between the two, potentially independent, time series. One approach is self-referential—comparing parts of a time series to itself—which generally involves maintaining a large database of previous windows and comparing the current time series against some or all of those samples. This approach is operationally expensive, both in memory and number of comparisons.

An embodiment of the present disclosure provides an apparatus to classify processor events. The apparatus includes a reference generator configured to provide a self-reference for an event vector stream based on a history of the event vector stream, where each event vector of the event vector stream is generated from an event signal stream of a processor and includes associated event time information. The apparatus also includes a warping unit configured to dynamically align the input event vector stream with a self-reference to generate a warped event vector stream, a correlation unit configured to determine a window-by-window correlation of event vectors of the warped event vector stream and a detector configured to pass a window of event vectors of the warped event vector stream to a behavioral classifier when the window-by-window correlation crosses a threshold value. A timer may be used to provide the event time information associated with events of the event signal stream, and an event encoder, operably coupled to the timer, used to generate the event vector stream based on the event signal stream.

The apparatus may also include a behavioral classifier configured to classify the processor events into one or more categories based on the window of event vectors. The behavioral classifier uses machine learning, for example.

A sample reservoir may be provided for storing dynamically selected event vectors of the event vector stream. The reference generator may be configured to generate, as the self-reference, a sequence of sampled events based on one or more statistical measures of the event vectors in the sample reservoir. Alternatively, the reference generator may generate, as the self-reference, a sequence of events based on the event vectors in the sample reservoir or a proxy measurement based on one or more statistical measures of event vectors in the sample reservoir.

The apparatus may be implemented as a hardware accelerator in a system on a chip (SoC) and may utilize an arithmetic logic circuit for performing "one-hot" arithmetic.

In operation, the apparatus performs a method including generating a self-reference for an event vector stream based on a history of the event vector stream of a processor, dynamically warping the event vector stream to align with the reference sequence of event vectors and generate a warped event vector stream, determining a window-by-window correlation of event vectors of the warped event vector stream, and passing a window of event vectors of the warped event vector stream to a behavioral classifier when the window-by-window correlation crosses a threshold value. Based on the window of event vectors, the behavioral classifier may determine when the behavior of the processor is suspicious and alert a reactive security system.

The event stream may be warped to maximize a correlation with a self-reference sequence, to minimize a distance to a self-reference sequence or to match a self-reference statistic, etc. An optimal length of the window of event vectors of the warped event vector stream is determined based on the window-by-window correlation of event vectors of the warped event vector stream.

FIG. 1 is a block diagram of a data processing system 100 with event classification, in accordance with various representative embodiments. In operation, processor 102 generates a stream of event signals 104 corresponding to various events occurring in the processing system. Processor 102 may include a central processing unit (CPU), graphics processing unit (GPU), microcontroller, or computing unit (e.g., multiplier-accumulator (MAC) unit with memory). Processor 102 may also include other circuits such as, but not limited to, accelerators, memory controllers, cache controllers, bus interface units, network interface controllers, mixed signal blocks (such as a radio interface), digital filters and peripherals, for example. In a further embodiment, the stream of event signals can, for example, be a bit stream produced by a performance monitoring unit (PMU) that monitors and records actions of the processor. The events can describe issues that occur during execution of commands from the processor. Events can include, but are not limited to, branch mis-predict, load retired, store retired, branch retired, and cache miss. Events may be 1-bit information or multi-bit signals (e.g., 2-bits, 3-bits). Events can come from a variety of sources. They may be PMU events or an event derived from combinations of existing sources.

Referring again to FIG. 1, event encoder 106 receives the stream of event signals 104 and encodes them to produce a stream of event vectors 108. The event vectors 108 include timing information 110 generated by timer 112, for example. For example, an event vector may be of the form $\vec{v}_i = [t_i, \vec{e}_i]^T$, where $t_i$, is the time of the $i^{th}$ event, and $\vec{e}_i = [e_i^0, e_i^1, \ldots, e_i^{N-1}]^T$, where $e_i^j = 1$ when event j occurs at time $t_i$, and $e_i^j = 0$ otherwise. The event time $t_i$ may be, for example, an absolute time, a cycle count, or an elapsed time from the previous event and may be measured in any units. Event vector stream 108 is a series or sequence of event vectors $\vec{v}_i$.

An objective of the present disclosure is to classify behavior of processor 102 based on the event vector stream 108. To this end, dynamic warping and window selection circuit 110 is used to provide data 112 to classifier 114. Classifier 114 can be a nearest neighbor classifier/approximate nearest neighbor classifier, a decision tree classifier, a support vector machine, classical machine learning classifier, artificial neural network or other suitable classifier. Data 112 comprises a window of event vectors of the dynamically warped event vector stream. The length of the window is selected automatically, as will be described below. Thus, window of event vectors 112 provided by dynamic warping and window selection circuit 110 constitutes a "feature vector" that is used to classify behavior of processor 102.

Classifier 114 provides, as output, an indicator 116 of the behavior class. Optionally, classifier 114 may provide an alert signal 118 when the behavior is determined to be suspicious or unexpected, perhaps indicative of a security breach. Alert signal 118 may be provided to a reactive security system 120 to indicate that remediation action may be required.

Figure 2:
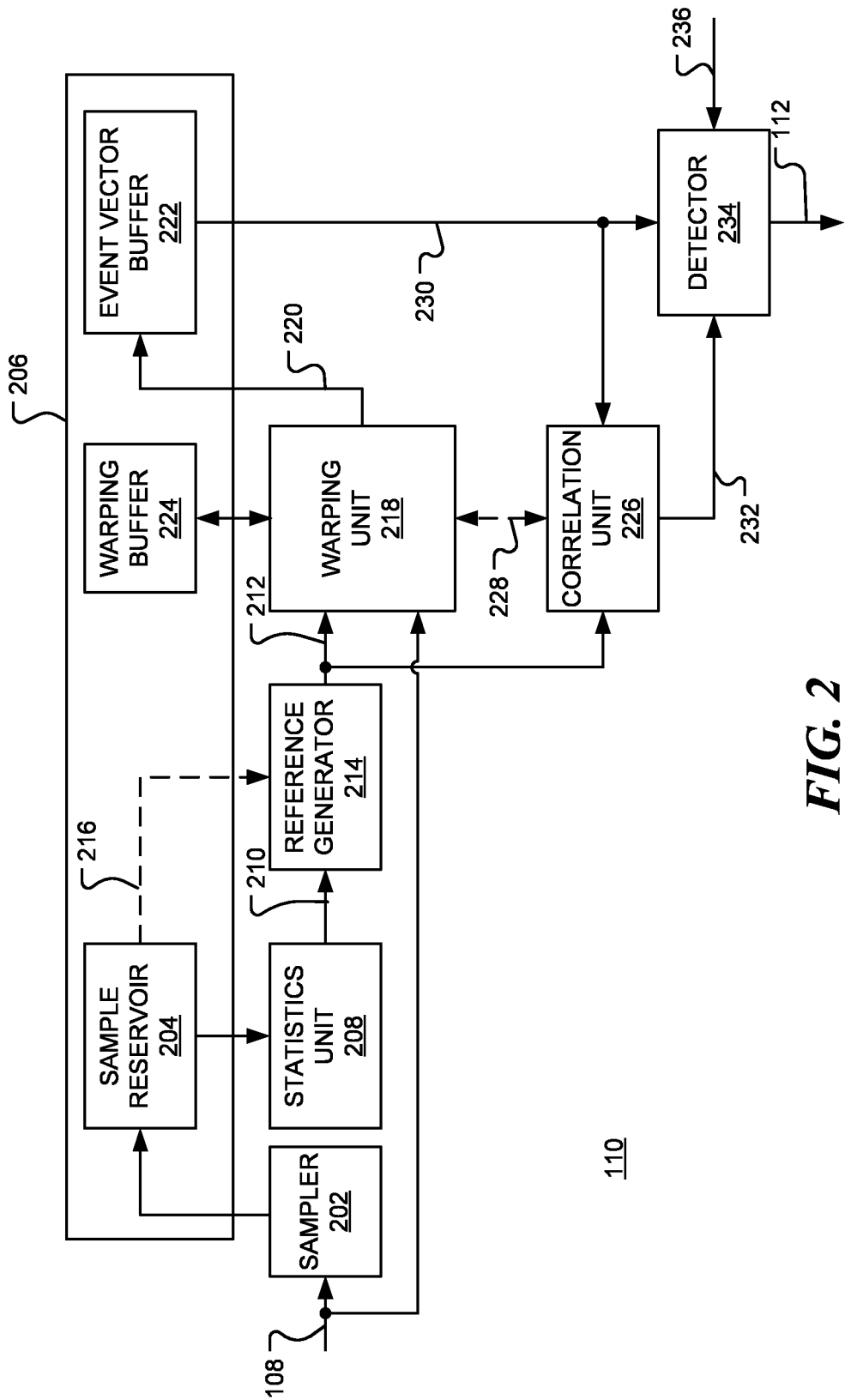
FIG. 2 is a block diagram illustrating a warping and window selection circuit, in accordance with various representative embodiments.

FIG. 2 is a block diagram illustrating a warping and window selection circuit 110, in accordance with various representative embodiments. Circuit 110 receives, as input, a stream of event vectors 108. Sampler 202 dynamically selects event vectors from the stream to be stored in sample reservoir 204 in storage 206. Sample reservoir 204 may be stored in local storage, such as a scratch pad memory, or in other storage. In one embodiment, the samples to be stored are selected and replaced to approximate samples taken randomly with uniform probability from the stream. Sample reservoir 204 may be of any size, e.g., 500 samples. The quality of estimates for reservoir sampling schemes is related to the number of memory elements used internally for storage. Thus, there is a tradeoff between accuracy and memory requirements. Statistics unit 208 computes statistics 210 of the event vector stream based on the event vectors in sample reservoir 204. For example, the mean and variance of the stream may be estimated for each vector component using just two memory elements for each from sample reservoir 204.

Based on estimated statistics 210, a self-reference 212 is generated by reference generator 214. Self-reference 212 may an actual sequence of events or a proxy measurement such as a statistic of the events in sample reservoir 204. In one embodiment, a reference sequence is generated by drawing samples from a Gaussian or other distribution with the zero mean and the estimated variance. In a further embodiment, prior event vectors, such as event vectors 216, are altered to provide a sequence with the desired mean and variance. In a still further embodiment, the reference sequence is set to a preselected sequence and adjusted according to the mean and variance values.

Warping alignment circuit 218 aligns the incoming stream of event vectors 108 with self-reference 212. This may be done using dynamic time warping (DTW), for example. In one embodiment, DTW seeks to minimize a distance between the reference sequence and a window of event vectors. Various distance metrics may be used, such as the L2 or Euclidean distance $\|\vec{v}_j^{ref}-\vec{v}_{I(j)}\|_2$, where I(j) is the index of the event vector aligned with reference element j. Alternatively, a Levenshtein or Hamming distance could be used. In a further embodiment, when the distribution of event times is independent from the type of event, the distance may be computed as $D=\Sigma_j(t_{I(j)}-t_j^{ref})\times(|\vec{e}_{I(j)}-\vec{e}_j^{ref}|)$. In a still further example, the distance is computed as $D=\Sigma_j(t_{I(j)}-t_j^{ref})\times(|\vec{e}_{I(j)}-\vec{e}_j^{ref}|)$. The warped event vectors 220 are stored in buffer 222. Intermediate results from the warping operation may be stored in buffer 224. For example, warping could be optimized for two or more past event vectors rather than just the most recently received event vector.

In a further embodiment, warping is performed to maximize a correlation between the warped event vectors 220 and the self-reference 212. Correlations may be computed in correlation unit 226, for example, as indicated by dotted arrow 228.

In a still further embodiment, the event vectors may be warped, e.g., by linear expansion or contraction, to match self-reference statistics. In this embodiment, no self-reference sequence need be generated.

Correlation unit 216 generates a window-by-window correlation of event vectors 230 of the warped event vector stream with self-reference 212. The resulting correlation 232 is used in decision module 234 which, in turn, decides if a warped window of event vectors 112 should be passed to the classifier. Here, the term "correlation" is taken to mean any measure of similarity, such as a correlation coefficient or an entropy measure, for example. Decision module 234 may compare correlation 232 to a threshold value 236. The warped window of event vectors may be passed to the classifier when the correlation exceeds a first threshold (indicating similar or matched windows) or falls below a second threshold (indicating mis-matched windows).

Figure 3:
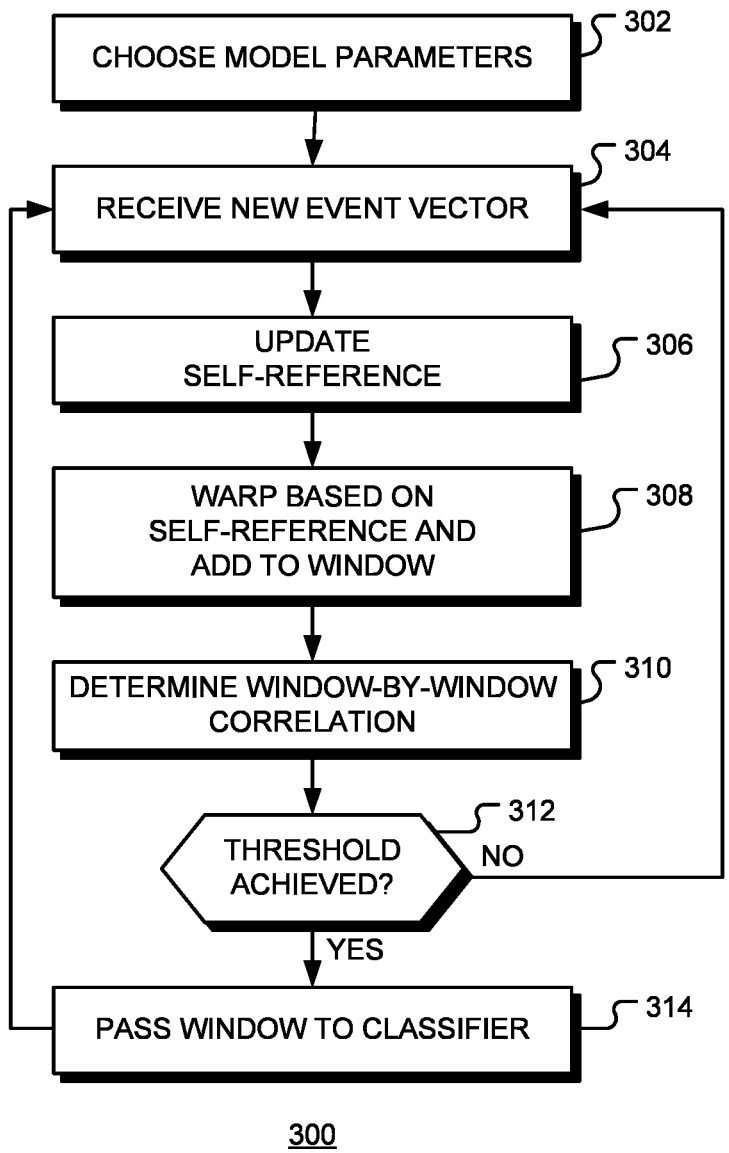
FIG. 3 is a flow chart of a method of warping a stream of event events and selecting a window of warped vectors to pass to a classifier, in accordance with various representative embodiments.

FIG. 3 is a flow chart 300 of a method for warping a stream of event vectors and selecting a window of warped vectors to pass to a classifier, in accordance with various representative embodiments. The method uses a combination of dynamic warping and correlation, together with reservoir sampling for estimating basic statistics from an infinite stream of data. The method provides a self-referential model that knows when it has enough information to "split" or "segment" windows.

In one embodiment, the event vectors are encoded in a "one-hot" format. This facilitates the building of efficient hardware for implementing the method at extremely high throughputs.

At block 302, hyperparameters of the model are chosen. The model may include a warping boundary, such as an Itakura Parallelogram or maximum warp. The hyperparameters of the model include any relevant parameters of the bounding system (such as the maximum Itakura gradient), as well as maximum window size (m) (m=500 in an example implementation) and parameters of the distribution approximation scheme. Other hyperparameters may include a historical scaling factor (w) that re-weights the benefit function contribution of older points in the time series as it progresses, as well as a threshold (T) after which contributions are not considered.

Optionally, at block 302, dynamic programming grids F and U are initialized, where F[I,j] corresponds to the optimal values (overall benefit, current window benefit, current window variance, etc.), on the assumption that vector I in the event vector stream is paired with vector j in the reference. U corresponds to the optimal move made on the warping path to achieve this value. These grids may be buffered in memory such that everything past the re-windowing threshold is discarded by combining the DTW bounds with the threshold. I.e., entries in columns corresponding to anything which is outside of the current matching contenders (those points in the input time series which the specified bounds could permit to be allocated to the current window of event vectors) are only useful, once computed, in constructing the optimal warping path for past windows. Thus, old windows are not redefined but rather dynamically aligned. For example, on the window which corresponds to the one before the one currently receiving data, the contributions do not need to be remembered. In other words, the forgetfulness threshold is set to two windows.

At block 304, a new event vector of the stream is received. At block 306, the self-reference is updated. This may include updating the sample reservoir, updating statistics of the samples in the reservoir and, optionally, generating a new event vector in the self-reference sequence. Reservoir sampling is a generic tool for choosing samples uniformly at random from a sequence of arbitrary length using a restricted amount of memory.

Reference sequences are generated in a non-deterministic manner based on estimated statistics of the event vector stream. These statistics are tracked dynamically using reservoir sampling. Thus, the reference sequences are adjusted dynamically to follow a distribution that, in turn, follows that of the input event vector stream—except that the variance adjustment is parameterized to increase both obfuscation and constructive overwhelming of the local noise extant in the original trace. One approach generates the reference sequence as a time-lagged version of the original trace with symmetric noise introduced. Thus, the reference sequence is a perfect sample from the original distribution. The accuracy of the reference trace is adjusted in a hyperparameter tuning phase according to the nature of the data distribution. An alternative approach estimates the variance of the event vector stream using the sample reservoir and generates the reference trace by drawing samples according to a Gaussian distribution with mean zero and the variance as calculated. The mean (u) is set to zero since the distance from the mean is the element-wise value relevant to the correlation metric calculation.

No presumptions are made regarding the reference trace. If, for example, the reference trace was chosen using k-means cluster centers with standard Euclidean metrics, an attacker could exploit the fact that k-means was used to presumptively match the input data closer to its predicted cluster, undermining the purpose of using a more expressive machine learning (ML) model to actually perform the classification. In addition, another model would be introduced which would need be queried at each time step.

Warping is applied to the new vector at block 308. This may include adding the new event vector to a window of warped event vectors, inserting an additional event vector or deleting an event vector, as in dynamic time warping (DTW) for example. In one embodiment, a dynamic programming (DP) grid is adjusted accordingly (dropping the old entries and allocating space for new ones). In DTW, the benefit (or cost) functions at F[I−1, j−1], F[I, j−1] and F[I−1,j], are evaluated and compared. Optionally, as added protection against concept drift, the contribution of the benefit is weighted by multiplying with a value w. When 0<w<1, the contribution is decreased in magnitude.

In one embodiment, the warping operation minimizes a cost function that provides a measure of a difference between the reference sequence and the event vector stream. In a further embodiment, correlation is used as a metric, similar to that used in Correlation Optimized Warping (COW). In COW the warping is chosen to maximize a benefit function (the correlation). However, the optimization goal is treated as a discrete, high-precision, sequence alignment problem, similar to that in Dynamic Time Warping (DTW). The correlation metric may be approximated by using an a priori estimator of the sample mean provided through reservoir sampling, as described above. The mechanism may use a comparatively numerically stable semi-heuristic approach for the bivariate optimization of both covariance and standard deviation of a windowed section of the time series to reduce the complexity. The resulting complexity is no worse than quadratic in the size of the buffered the series. In contrast, in a naïve solution, applying no heuristics or estimators, would reach quartic complexity.

The benefit function contribution for F[I,j] is calculated by first taking the dot product of $\vec{v}_j^{ref}$ and $\vec{v}_I - \vec{\mu}$ and adding this to the sum of these dot products calculated up until this point in the window corresponding to j (stored in F). Here, the vector $\vec{\mu}$ denotes the mean value (the reference sequence has zero mean). The dot product $(\vec{v}_j^{ref})^T(\vec{v}_I - \vec{\mu})$ is then added to the sum of these dot products calculated up until this point in the window corresponding to j (again, stored in F). The benefit contribution is determined by the covariance sum divided by the variance sum. In one embodiment, the benefit contribution is given by the sample correlation coefficient $$\frac{\sum_{j \in W}(\vec{v}_j^{ref})^T(\vec{v}_I - \vec{\mu})}{S^{ref} \cdot S^{warp}},$$

where $S^{ref} = \sqrt{\sum_{j \in W}(\vec{v}_j^{ref})^T \vec{v}_j^{ref}}$ of (which is related to the standard deviation of the events in the sample reservoir), and $S^{warp} = \sqrt{\sum_{j \in W}(\vec{v}_I - \vec{\mu})^T(\vec{v}_I - \vec{\mu})}$ is calculated from the events in the warped window. The sum is taken over events j in the window, W. As above, I=I(j) is the index of the event vector aligned with reference sequence vector j. This provides a heuristic approach to maximizing the benefit function that makes an approximation that the optimal warping path chosen in this way up to element x will be the first x elements of the optimal path up to element x+1. The method is exact when window-by-window variance is not considered but is an approximation when it is also considered in the benefit function.

When variance of the window is not considered (i.e., window variance is not tracked and the reservoir sampling produces an a priori value), undesirable effects can occur as there is a tendency to over-represent outliers in the resultant warping (expanding segments of high variance and squeezing segments of low variance). Despite leading to a lower quality overall windowed correlation coefficient, this leads to catastrophic cancellation from estimating both mean and variance.

The warping technique operates in an expressive, unbiased way: warping the event vector stream based on correlation with a reference sequence, such as a stochastically lagged version of the non-warped input time series with low-magnitude local Gaussian noise introduced. The added Gaussian noise reduces the contribution of local system noise to the benefit function computation, making it harder for an attacker to reverse-engineer the system.

It is noted that the input signals may be represented as low bit vectors, either "one-hot" encoded or some small, quantized value. This enables the use of highly efficient hardware accelerators in the data pipeline for performing multiplications and other operations.

The warping path is applied the event vector stream and used to update the window.

Since a warping path requires a known start point, there are a number of possible ways to select this. The most obvious way to choose this is to finalize the end point of the previously processed window and begin the warping path from here. This will guarantee the locally optimal solution for the window being processed and can also lead to stricter bounds which reduces the amount of DP grid memory but may be short sighted. An alternative approach is to begin the warping from the most recently processed data point.

A window-by-window correlation is computed at block 310 for the window of warped event vectors. Once a warping path that completely decides a window is finalized, the window, or features extracted from the window, are sent to the classifier at block 316. The objective is to choose the data points to push into the detection window for the classifier.

Example Results

In an example configuration, a window length of 500 was used and event streams were generated for comparable malicious/benign workloads. L2 norms between extracted features of comparable windows were computed and averaged. This served as a proxy for estimating cluster density of a naïve k-means approach to classification.

In the example results, the warping path was estimated using dynamic time warping (DTW) over a window rather than event-by-event processing of a stream. The warping path was constrained using an Itakura Parallelogram with maximum gradient 1.5, history weighting of 0.95 for non-match warps (malicious/benign) and history weighting of 0.975 for matching warps (malicious/malicious or benign/benign). The variance was computed using a sample reservoir of 500 samples. A reference sequence was obtained by adjusting a two-window lagged record of the time series to have zero mean and the estimated variance and then adding a vector of independent uniform noise in the interval (−0.4, 0.4) added. A memory threshold was set to encompass all 35 workload windows so as to give the best comparison against non-streamed DTW.

In the unprocessed case, the average L2 distance between corresponding windows in the same cluster was ~235, with ~279 between windows in different clusters, yielding a naïve cluster separation coefficient of 0.842 (smaller is better). When DTW is applied, the average distances become ~226 and ~213, respectively, giving a minor improvement in cluster density. The cluster separation coefficient was 1.06, indicating that a density increase is applied indiscriminately in a way which in fact merges clusters together. Finally, warping using a correlation-based benefit function led to distances of ~175 and ~196, yielding a cluster separation of 0.893. Use of a correlation-based cost function thus provides a 1.4× increase in cluster density, despite the seeming decrease in cluster separation, Greater separation can be achieved when structural noise mitigation is used with a model more expressive than naïve L2 k-means clustering or when hyperparameters are optimized. Even so, the example described above provides a clear advantage over self-referential DTW for this data.

The embodiments described herein are combinable.

In one embodiment, an apparatus to classify processor events, comprising a reference generator configured to provide a self-reference for an event vector stream based on a history of the event vector stream, where each event vector of the event vector stream is generated from an event signal stream of a processor and includes associated event time information, a warping unit configured to dynamically align the event vector stream with the self-reference to generate a warped event vector stream, a correlation unit configured to determine a window-by-window correlation of event vectors of the warped event vector stream, and a detector configured to pass a window of event vectors of the warped event vector stream to a behavioral classifier when the window-by-window correlation achieves a threshold value.

In another embodiment, the apparatus further comprising a timer to provide the event time information associated with events of the event signal stream, and an event encoder, operably coupled to the timer, to generate the event vector stream based on the event signal stream.

In an additional embodiment, the apparatus further comprising a behavioral classifier configured to classify the processor events into one or more categories based on the window of event vectors.

In an additional embodiment, the apparatus where the behavioral classifier uses machine learning.

In another embodiment, the apparatus further comprising a sample reservoir configured to store dynamically selected event vectors of the event vector stream, where the reference generator is configured to generate, as the self-reference, a sequence of events based on one or more statistical measures of the event vectors in the sample reservoir.

In another embodiment, the apparatus of further comprising a sample reservoir configured to store dynamically selected event vectors of the event vector stream, where the reference generator is configured to generate, as the self-reference, a sequence of events based on the event vectors in the sample reservoir.

In an additional embodiment, the apparatus further comprising a sample reservoir configured to store dynamically selected event vectors of the event vector stream, where the reference generator is configured to generate, as the self-reference, a proxy measurement based on one or more statistical measures of event vectors in the sample reservoir.

In an additional embodiment, the apparatus further comprising an arithmetic logic circuit for performing "one-hot" arithmetic.

In a further embodiment, the apparatus where the apparatus comprises a hardware accelerator.

In a further embodiment, a computer-implemented method of classifying processor events, the method comprising generating a self-reference for an event vector stream based on a history of the event vector stream of a processor, each event vector of the event vector stream including associated event time information, dynamically warping the event vector stream to align with the reference sequence of event vectors and generate a warped event vector stream, determining a window-by-window correlation of event vectors of the warped event vector stream, and passing a window of event vectors of the warped event vector stream to a behavioral classifier when the window-by-window correlation crosses a threshold value.

In another embodiment, the computer-implemented further comprising timing events of an event signal stream of the processor to provide the event timing information and generating the event vector stream based on the event signal stream and the event timing information.

In another embodiment, the computer-implemented method further comprising classifying, by the behavioral classifier, the behavior of the processor into one or more categories based on the window of event vectors.

In an additional embodiment, the computer-implemented method where said classifying includes machine learning.

In an additional embodiment, the computer-implemented method further comprising determining, by the behavioral classifier, when the behavior of the processor is suspicious based on the window of event vectors and alerting a reactive security system when the behavior of the processor is classified as suspicious.

In another embodiment, the computer-implemented method further comprising processing the event vector stream using "one hot" arithmetic.

In another embodiment, the computer-implemented method where said dynamically warping includes one or more of warping to maximize a correlation with a self-reference sequence, warping to minimize a distance to a self-reference sequence, and warping to match a self-reference statistic.

In a further embodiment, the computer-implemented method further comprising selectively storing event vectors of the event vector stream in a sample reservoir, dynamically updating the sample reservoir based on the event vector stream, determining one or more statistical measures of the event vectors in the sample reservoir and generating, as the self-reference, a reference sequence of event vectors based, at least in part, on the determined one or more statistical measures.

In a further embodiment, the computer-implemented method where said dynamically warping includes maximizing a correlation between event vectors of the event vector stream and event vectors of the reference sequence.

In an additional embodiment, the computer-implemented method where said dynamically warping includes minimizing a distance between event vectors of the event vector stream and event vectors of the reference sequence, and where the distance depends upon the event time information of the event vector of the event vector stream.

In an additional embodiment, the computer-implemented method further comprising determining an optimal length of the window of event vectors of the warped event vector stream based on the window-by-window correlation of event vectors of the warped event vector stream.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM), non-volatile memory (NVM), mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An apparatus to classify processor events, comprising a processing system executing programming instructions stored in memory to operate:
   a sample reservoir configured to store event vectors dynamically selected from an event vector stream, where each event vector of the event vector stream is generated from an event signal stream of a processor and includes associated event time information;
   a statistics unit configured to determine one or more statistical measures of the selected event vectors;
   a reference generator configured to:
   generate, as a self-reference sequence, a sequence of event vectors based on the one or more statistical measures;
   a warping unit configured to:
   receive the event vector stream and the self-reference sequence;
   dynamically align a window of event vectors of the event vector stream with the self-reference sequence, said dynamically aligning including:
   receiving a new event vector of the event vector stream; and adding the new event vector to the window of event vectors:
warping the window of event vectors, based on the self-reference sequence, to provide a warped window of event vectors;
a correlation unit configured to determine a window-by-window correlation of warped windows of event vectors; and
a detector configured to provide the warped window of event vectors as a feature vector to a behavioral classifier when the window-by-window correlation achieves a threshold value;
determine, by the behavioral classifier, when the behavior of the processor is suspicious based on the warped window of event vectors; and
alert a reactive security system when the behavior of the processor is classified as suspicious.

2. The apparatus of claim 1, where the one or more statistical measures include a variance of the selected event vectors in the sample reservoir.

3. The apparatus of claim 2, where the reference generator is configured to generate, the self-reference sequence by drawing samples according to a Gaussian distribution with the variance of the selected event vectors in the sample reservoir.

4. The apparatus of claim 1, further comprising: a timer to provide the event time information associated with events of the event signal stream; and
an event encoder, operably coupled to the timer, to generate the event vector stream based on the event signal stream.

5. The apparatus of claim 1, further comprising the behavioral classifier configured to classify the processor events into one or more categories based on the feature vector.

6. The apparatus of claim 1, where the samples stored in the sample reservoir approximate samples taken randomly with uniform probability from the event vector stream.

7. The apparatus of claim 1, where the reference generator is configured to generate, as the self-reference sequence, a proxy measurement based on the one or more statistical measures of event vectors in the sample reservoir.

8. The apparatus of claim 1, further comprising an arithmetic logic circuit for performing "one-hot" arithmetic, where an event vector is of the form $\vec{v}_i=[t_i, \vec{e}_i]^T$, where $t_i$ is the time of the $i^{th}$ event, and $\vec{e}_i=[e_i^0, e_i^1, \ldots, e_i^{N-1}]^T$, where $e_i^j=1$ when event j occurs at time $t_i$, and $e_i^j=0$ otherwise.

9. The apparatus of claim 1, where the apparatus comprises a hardware accelerator.

10. A computer-implemented method of classifying processor events, the method comprising:
dynamically selecting event vectors from an event vector stream, where each event vector of the event vector stream is generated from an event signal stream of a processor and includes associated event time information;
storing the selected event vectors in a sample reservoir;
determining one or more statistical measures of the selected event vectors in the sample reservoir;
generating, as a self-reference sequence, a reference sequence of event vectors based, at least in part, on the one or more statistical measures;
dynamically warping a window of event vectors of the event vector stream to align with the self-reference sequence and generate a warped window of event vectors, said dynamically warping including:
receiving a new event vector of the window of event vectors;
adding the new event vector to the window of event vectors; and
warping the window of event vectors, based on the self-reference sequence, to provide a warped window of event vectors;
determining a window-by-window correlation of warped windows of event vectors; and
providing the warped window of event vectors as a feature vector to a behavioral classifier when the window-by-window correlation crosses a threshold value;
determining, by the behavioral classifier, when the behavior of the processor is suspicious based on the warped window of event vectors; and
alerting a reactive security system when the behavior of the processor is classified as suspicious.

11. The computer-implemented method of claim 10, further comprising:
dynamically selecting event vectors of the event vector stream and replacing event vectors stored in the sample reservoir such that the samples stored in the sample reservoir approximate samples taken randomly with uniform probability from the event vector stream.

12. The computer-implemented method of claim 11, where said dynamically warping includes maximizing a correlation between event vectors of the event vector stream and event vectors of the self-reference sequence.

13. The computer-implemented method of claim 11, where said dynamically warping includes minimizing a distance between event vectors of the event vector stream and event vectors of the reference sequence, and where the distance depends upon the event time information of the event vector of the event vector stream.

14. The computer-implemented method of claim 11, further comprising:
determining an optimal length of the window of event vectors of the warped event vector stream based on the window-by-window correlation of warped windows of event vectors.

15. The computer-implemented method of claim 10, further comprising classifying, by the behavioral classifier, the behavior of the processor into one or more categories based on the provided feature vector.

16. The computer-implemented method of claim 15, where said classifying includes machine learning.

17. The computer-implemented method of claim 10, further comprising:
timing events of an event signal stream of the processor to provide the event timing information; and
generating the event vector stream based on the event signal stream and the event timing information.

18. The computer-implemented method of claim 10, where an event vector is of the form $\vec{v}_i=[t_i,\vec{e}_i]^T$, where $t_i$ is the time of the $i^{th}$ event, and $\vec{e}_i=[e_i^0, e_i^1, \ldots, e_i^{N-1}]^T$, where $e_i^j=1$ when event j occurs at time $t_i$, and $e_i^j=0$ otherwise, the method further comprising processing the event stream using "one hot" arithmetic.

19. The computer-implemented method of claim 10, where said dynamically warping includes one or more of:
   warping to maximize a correlation with a self-reference sequence;
   warping to minimize a distance to a self-reference sequence, and
   warping to match a self-reference statistic.

* * * * *